United States Patent
Gal

[15] 3,650,017
[45] Mar. 21, 1972

[54] METHOD AND APPARATUS FOR COATING A WORKPIECE WITH SOLDER

[72] Inventor: Pal Gal, Budapest, Hungary
[73] Assignee: Licencia
[22] Filed: Oct. 2, 1969
[21] Appl. No.: 863,247

[52] U.S. Cl.................29/527.4, 29/458, 29/503, 29/DIG. 2, 118/44, 228/15, 228/40
[51] Int. Cl. ................................B23p 17/00, B23p 25/00
[58] Field of Search..........29/527.4, 503, DIG. 2; 228/1, 228/15, 40, 36, 458; 117/51; 118/44

[56] References Cited

UNITED STATES PATENTS

| | | | |
|---|---|---|---|
| 1,340,264 | 5/1920 | Dean | 29/527.4 X |
| 1,984,624 | 12/1934 | Bagley | 117/51 |
| 3,131,093 | 4/1964 | Wildebour | 228/1 UX |
| 2,426,650 | 9/1947 | Sivian | 29/502 X |
| 3,391,450 | 7/1968 | Bauer | 29/527.4 |
| 3,284,892 | 11/1966 | Wade | 29/527.4 |
| 101,264 | 3/1870 | Hill | 118/44 X |
| 2,136,538 | 11/1938 | Borwick | 72/39 |
| 3,582,478 | 6/1971 | Kelly et al. | 29/527.4 X |

Primary Examiner—John F. Campbell
Assistant Examiner—Donald C. Reiley, III
Attorney—Arthur O. Klein

[57] ABSTRACT

A process for coating a workpiece of light metal or light metal alloy with soft-solder which comprises working those surfaces of the workpiece which are to be coated in an oxygen-free medium and while excluding oxygen therefrom contacting said workpiece with a soft solder bath.

16 Claims, 3 Drawing Figures

PATENTED MAR 21 1972 3,650,017

INVENTOR:
Pól GÁL

BY Arthur O. Klein
ATTORNEY

METHOD AND APPARATUS FOR COATING A WORKPIECE WITH SOLDER

The invention concerns improvements in soldering and more particularly concerns a process and an apparatus for the soft soldering of light metals and light metal alloys.

Components which are liable to suffer much corrosion, especially radiators and heat exchangers in mechanical engineering and in the chemical and food industries, are manufactured generally from combinations of copper and steel, e.g., from copper tubes and steel sheets, in order to prevent corrosion. When materials of this kind are used, the surfaces of the components are coated with an alloy of tin and lead, i.e., with a hot-dipped coating, as a result of which both a protection from corrosion, as well as a metallic bond along the areas of contact of the components are achieved. However, only relatively heavy and also very expensive apparatus can be constructed in this manner.

On the other hand, in modern mechanical engineering apparatus are required, the weight and production costs of which should be relatively low with a maximum length of life. Due to this consideration, the use of aluminum and its alloys or of other light metals, e.g., magnesium, and their alloys is very advantageous particularly in radiators and heat exchangers since these materials have a low specific weight, advantageous thermal properties, good corrosion resistance, and are relatively cheap. The use of the above-mentioned materials in this field, however, is made difficult by the fact that the surface of these materials is covered by a high melting point oxide layer as a result of which the formation of a metallic bond along the areas of contact of components of light metals or light metal alloys cannot be effected without deoxidation.

Previous deoxidizing methods of soft soldering e.g., scratch or skim soldering, soldering with a fluxing material, reactive soldering and soldering in the presence of ultrasonics have not been successful in practice due to the tendency to corrosion, the absence of a satisfactory bonding force and low output. The known process of producing a mechanical bond e.g., by rollers or balls is very costly but nevertheless insufficiently reliable.

In view of the above factors and due to the great risk of aluminum becoming corroded by the known processes, the soft-soldering of aluminum components has been avoided in the manufacture of heat exchangers, and in practice soldered aluminum components have not been produced in this sector of the industry.

It is an object of the invention to mitigate the above disadvantages by providing firstly a simple and inexpensive process for the soft-soldering of light metals and light metal alloys, particularly of aluminum and aluminum alloys, whilst producing a bond of sufficient strength even in articles having surfaces of a complicated shape, as well as in mass production.

The invention is based on the finding that aluminum and its alloys or light metals and their alloys can be shaped or worked even at the temperatures of soft solder baths without mechanical damage, e.g., tearing, and without any detrimental changes in their mechanical properties. This finding is surprising because on the basis of the known prior art it would have been expected that at the high temperatures involved and due to the deformation undesirable damage would be caused.

The invention is further based on the finding that even at the temperature of soft solder baths the oxide layer adheres with sufficient adhesion to the surface of light metals or light metal alloys, and effectively seals such surfaces even when they are bent. This finding is very surprising since the thermal expansion coefficients of light metals and of oxides thereof, e.g., of aluminum and aluminum oxide, are quite different, this coefficient being generally much higher in the case of the metal; consequently it would have been expected that at the temperatures of soft solder baths the oxide layer would become, at least in part, detached from the surface or would crack.

The invention is finally based on the finding that if the surfaces of articles of light metals or light metal alloys, which are to be soldered, are worked in an oxygen-free medium and/or in a soft solder bath and are at the same time or subsequently dipped into a soft solder bath with the exclusion of oxygen, only the worked surface of the articles is coated or alloyed with the soft solder. This finding is surprising since with other metals, e.g., iron and copper, not only the worked surface but the whole surface dipped into the soft solder bath is coated with soft solder.

According to the invention there is provided a process for coating a workpiece of light metal or light metal alloy with soft solder which comprises working those surfaces of the workpiece which are to be coated in an oxygen-free medium and while excluding oxygen therefrom contacting said workpiece with a soft solder bath.

The process of the invention has the result that the metal oxide layers are only removed from the surfaces to be soldered of the components to be joined, whereby a thin (0.01 to 0.05 mm. thick) soft solder coating is applied to the surfaces freed of the metal oxide layer, which coating is alloyed with the surface of the article. The undeformed surfaces remain clean and free of metal even if the shaping tool has also mechanically engaged such undeformed surface portions of the article during the shaping.

It is advisable to carry out the working by a noncutting treatment of the surfaces to be soldered, e.g., by flanging, punching, peeling off or the like by means of a suitably constructed tool.

From the viewpoint of the result of the process of the invention it is completely immaterial whether the working is carried out in an oxygen-free atmosphere and the article or its worked surfaces is/are dipped into the soft solder bath with the exclusion of oxygen, or whether the working also is carried out in the soft solder bath.

The interconnection of articles provided with a soft solder coating with the aid of the process of the invention is preferably carried out by bolting them together or by galvanization. Also in the latter case a metal coating is only applied to the surfaces freed of the oxide layer. A reliable metallic bond at the places provided with a soft solder coating is produced in this way.

As has already been mentioned above, the mechanical properties of the articles to be worked are not disadvantageously influenced at the temperature (about 300°–350° C) of the soft solder bath. Also the working tools can be exposed to these temperatures without any damage. If e.g., a thin aluminum plate is worked, e.g., punched, in a soft solder bath, the plate exhibits practically its original hardness after cooling.

In the process according to the invention it is advisable to use readily fusible, dilute baths because it is not necessary to use those soft solder alloys which remain on the surfaces to be soldered for a long time in a "pasty" state (i.e. which have a long plastic range) in order to prevent e.g., in the case of scratch soldering a melting on or a dripping off the surface.

In the selection of the soft solder to be used it is advisable to take into consideration that, of the so-called heavy metals, in the first place zinc is dissolved at room temperature e.g., in aluminum. Accordingly one constituent of the soft solder will generally be zinc. In the choice of the further constituents of the soft solder it is advisable to take into consideration, besides the corrosion resistance and strength, also the cost of the constituent. In view of these considerations the eutectic alloys with a low melting point, e.g., the eutectic mixture of 17.5 percent of zinc and 82.5 percent of cadmium, with which it is easy to work at a temperature of 300° to 320° C, is very advantageous.

In the process according to the invention substantially no impurities which may induce corrosion remain on the surface of the workpiece; accordingly the bond formed between the base metal or metal alloy and the soft solder material is extremely strong. The corrosion resistance of the bond can, however, be increased if the soldered joints are coated with a layer of lacquer, the thickness of which is a few microns. In the selection of the substance for the layer of lacquer, advantageously rapidly drying lacquers mixed with an aluminum pigment are preferred which ensure a high corrosion resistance, the heat transfer properties not being impaired due to the thinness of the layer of lacquer.

The process of the invention can also be used for articles in which a bond is to be formed between a light metal component, e.g., an aluminum component, and a component of a different metal, e.g., copper or steel which is highly resistant to acids.

For carrying out the process according to the invention, there is provided apparatus comprising a tank adapted to hold a soft solder bath, means for heating said tank, means for clamping a workpiece within said tank, means for working said workpiece while it is clamped within said tank, and means for withdrawing a worked workpiece from the said tank. The means for clamping the workpiece to be worked and also the means for working the workpiece are in use partly or wholly accommodated in the bath of soft solder or in an oxygen-free chamber located adjoining e.g., above this bath.

The process according to the invention can advantageously be carried out with an apparatus which includes one or more male dies, a hoisting fork and a cutting plate or female die. The die, hoisting fork and cutting plate are partially or wholly accommodated in a tank for receiving a soft solder bath.

The invention will be illustrated by way of example only with reference to the accompanying drawings, in which.

Identical reference numerals in the drawings refer to similar details.

Figure 1:
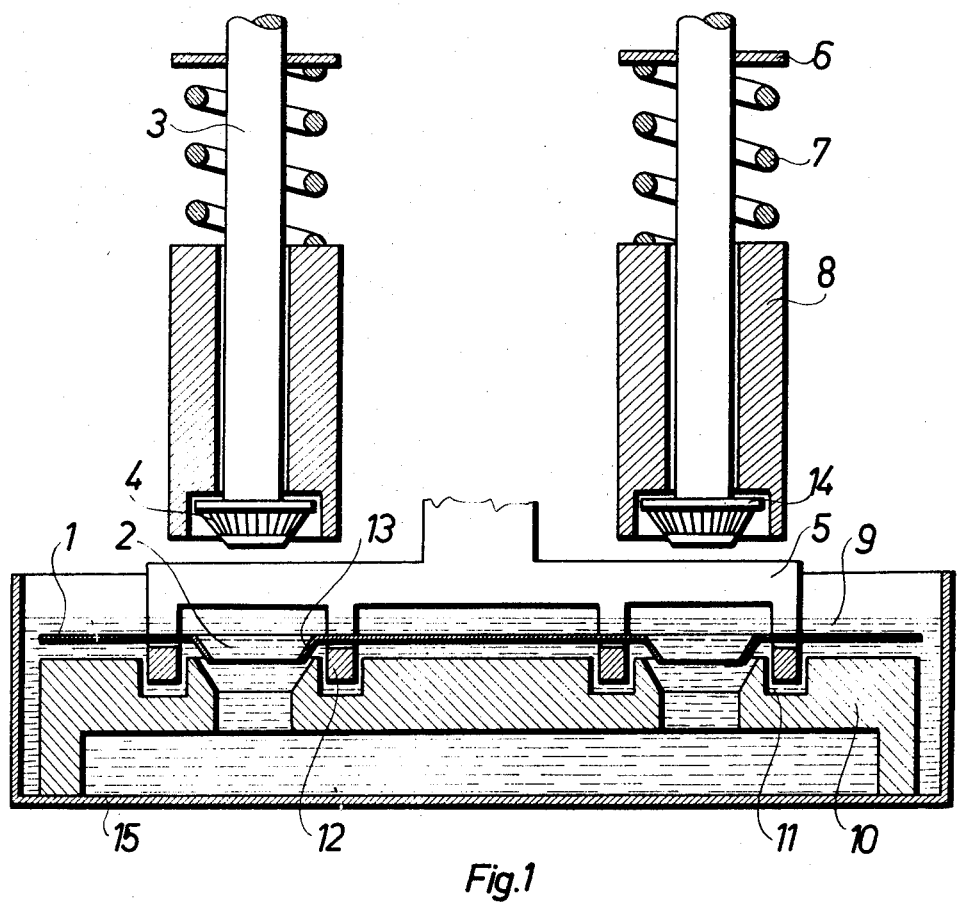
FIG. 1 shows a sectional view of an apparatus according to the invention.

As is apparent from FIG. 1, the apparatus comprises a tank 15 in which a workpiece holder 10 is mounted, in which grooves 11 for the fingers 12 of a hoisting fork 5 are provided. The shaping of the tube openings 2 of the flat workpiece 1 which is to be provided with a coating of soft solder, is carried out with the aid of conical and serrated dies 4 attached to the rams 3. Two identical dies 4 and rams 3 are provided, but for the sake of simplicity the apparatus will be described with reference to only one die 4 and ram 3. The workpiece is to be formed into a fin or lamination for a radiator or heat exchanger.

The illustrated apparatus works as follows:

The workpiece blank is placed in a prepunched state on the fingers 12 of the hoisting fork 5, and during the downward movement of the ram 3 the workpiece is pressed onto these fingers by means of a clamping bush 8 acted upon by a spring 7 which engages the collar 6. In the course of its further movement the ram 3 urges the clamped workpiece and the hoisting fork into the soft solder bath 9, while the fingers 12 are depressed into the grooves 11. At the same time the tube openings 2 of the workpiece 1 are flanged by the die 4, and during the flanging process a layer is removed from the internal surface of the tube openings by means of the sharp serrations on the die, and the oxide-free areas of contact 13 of the openings 2 come into diffusion contact with the soft solder bath 9. A thin soft solder coating, the thickness of which is a few hundredths of a millimeter is thus formed on the deoxidized areas of contact.

After the above operation the ram 3 is moved upwardly. The ram abuts with its shoulder 14 against the clamping bush 8, whereby the latter is raised at the same time. The workpiece 1 is now freed and lifted out of the hot solder bath by the hoisting fork moving upwardly in synchronization with the ram 3. The soft solder bath 9 is retained in the tank 15. The tank is heated in any desired manner, preferably electrically or with gas. The deoxidation can be carried out even more advantageously if during the treatment the ram is slowly rotated about its axis.

A certain amount of aluminum is dissolved in the soft solder bath from the workpiece and from the turnings formed while flanging. The maximum amount of aluminum which can be dissolved in the soft solder bath is less than 2 percent, the temperature of the bath being below 350° C. This small amount of dissolved aluminum metal enhances the formation of an intermetallic phase. The undissolved aluminum turnings separate on the surface of the bath as a supernatant consisting of aluminum as well as of the oxides of heavy metals forming the soft solder bath. Consequently, the bath can be used for a long time without the danger of enrichment in aluminum.

The said supernatant removed from the surface of the bath can be regenerated by methods known in the art.

Figure 2:
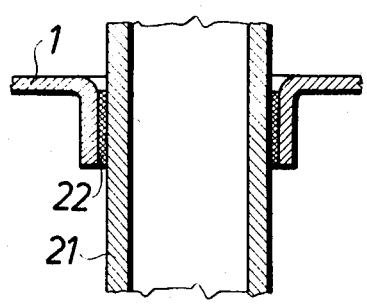
FIGS. 2 and 3 show various soldered joints in longitudinal sections, made with the aid of the process of the invention.

FIG. 2 shows a workpiece 1 produced by a modification of the apparatus shown in FIG. 1, wherein the die 4 is substantially cylindrical. This workpiece is provided with a soft solder coating in the above-described way, joined to a tube 21 having a cylindrical cross section. The soldered joint is formed along the inner surface of the soft solder coating 22.

Figure 3:
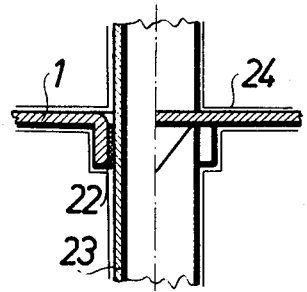

The joint according to FIG. 3 differs from that shown in FIG. 2 only in that a flat tube 23 is here employed, the soldered joint being covered and protected by a layer of lacquer 24.

Of the numerous advantages of the process according to the invention, the following may be mentioned:

a. It enables the formation of reliable and corrosion-resistant soft solder joints to light metals and light metal alloys.

b. It can also be used in mass production e.g., in an automated process.

c. It enables high output to be achieved because several surfaces may be coated with soft solder simultaneously.

d. It makes possible the coating with soft solder of only those surface portions which are to be soldered, thus saving material.

e. The soft solder applied to the surface forms an alloy with the base metal, whereby the surface coated with the soft solder can be shaped, if desired, without peeling off the solder coating.

f. The soft solder coating enables the production of a joint whose strength is substantially equal to that of the base metal.

g. It does not require a soldering flux, which is very advantageous both from a technical point of view as well as from the view point of the corrosion resistance of the joint.

h. It enables also the joining of light metals or light metal alloys with other metals or metal alloys, if the latter are tin-plated or galvanized prior to soldering.

i. It enables the manufacture of soldered, ribbed radiators, e.g., of cylindrical or flat-tube form, because in contrast to the hitherto known technique the tubes do not become detached from the laminations or fins.

j. It enables the production of gastight joints in light metal, e.g., aluminum, tubes which are resistant even to high pressures (e.g. 20 atmospheres).

I claim:

1. A process for coating only certain surface portions of a workpiece of light metal or light metal alloy with soft-solder, said workpiece having an oxidized surface which prevents soldering, said process comprising working and shaping to a desired substantially altered configuration those surface portions of the workpiece which are to be coated in the oxygen-free medium, immersing the workpiece in a soft solder bath while excluding oxygen therefrom contacting said workpiece, and coating said surface portions of the workpiece with soft solder.

2. A process as claimed in claim 1 wherein said light metal or light metal alloy is aluminum or an alloy thereof.

3. A process as claimed in claim 1 wherein said workpiece is a component of a heat exchanger.

4. A process as claimed in claim 1 wherein said working and shaping is performed in an inert gaseous medium whereafter the workpiece is immersed in said soft solder bath.

5. A process as claimed in claim 4 wherein said medium is liquid.

6. A process as claimed in claim 1 wherein at least part of said working and shaping is performed beneath the surface of said soft solder bath.

7. A process as claimed in claim 1 wherein said soft solder includes zinc.

8. A process as claimed in claim 7 wherein said soft solder is substantially an eutectic mixture of 17.5 percent zinc and 82.5 percent cadmium.

9. A process as claimed in claim 1 wherein said working and shaping is performed by cooperating dies.

10. A process as claimed in claim 9 wherein at least one of said dies rotates relative to the workpiece during the working operation, whereafter a soldered joint is made to that part of the workpiece which has been coated with soft solder.

11. A process as claimed in claim 10 in which a layer of lacquer is then applied to said soldered joint.

12. A process as claimed in claim 11 in which said lacquer is admixed with finely particulate aluminum.

13. Apparatus for coating only certain surface portions of a workpiece of light metal or light metal alloy with soft solder, comprising a tank adapted to hold a soft solder bath, means for heating said tank, means for clamping a workpiece within said tank, means for working and shaping only those surface portions of said workpiece which are to be coated to a desired substantially altered configuration while said workpiece is clamped within said tank, and means for withdrawing said worked, shaped and coated workpiece from said tank.

14. Apparatus as claimed in claim 13 wherein the means for working and shaping said workpiece comprises at least one pair of cooperating dies.

15. Apparatus as claimed in claim 14 wherein at least one of said dies is arranged to rotate while working and shaping the workpiece.

16. Apparatus for coating only certain surface portions of a workpiece of light metal or light metal alloy with soft solder, comprising a tank adapted to hold a soft solder bath, means for heating said tank, a chamber adjoining said tank adapted to be filled with an oxygen-free fluid medium, means in said chamber for clamping, working, and shaping said workpiece to a desired substantially altered configuration, and means for placing a workpiece which has been worked and shaped by said clamping, working, and shaping means in said tank while excluding oxygen from contact with said workpiece.

* * * * *